US011886628B2

(12) United States Patent
Nattinger et al.

(10) Patent No.: US 11,886,628 B2
(45) Date of Patent: Jan. 30, 2024

(54) NOTIFICATION DELIVERY BASED ON CONTEXT AWARENESS

(71) Applicant: Google LLC, Mountain View, CA (US)

(72) Inventors: Elena Jessop Nattinger, San Carlos, CA (US); Shengzhi Wu, Mountain View, CA (US); Diane C. Wang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 317 days.

(21) Appl. No.: 17/286,707

(22) PCT Filed: May 7, 2020

(86) PCT No.: PCT/US2020/031829
§ 371 (c)(1),
(2) Date: Apr. 19, 2021

(87) PCT Pub. No.: WO2021/225596
PCT Pub. Date: Nov. 11, 2021

(65) Prior Publication Data
US 2022/0050518 A1    Feb. 17, 2022

(51) Int. Cl.
*G06F 3/01* (2006.01)
*H04W 4/80* (2018.01)

(52) U.S. Cl.
CPC .............. *G06F 3/011* (2013.01); *G06F 3/016* (2013.01); *H04W 4/80* (2018.02)

(58) Field of Classification Search
CPC .... G06F 3/01; G06F 3/011–017; G06F 3/048; G06F 3/0487; H04W 4/80; H04W 68/005
See application file for complete search history.

(56) References Cited

U.S. PATENT DOCUMENTS

| 9,733,880 | B2 * | 8/2017 | Levesque | G06T 7/70 |
| 9,813,882 | B1 * | 11/2017 | Masterman | H04W 4/12 |
| 10,728,716 | B2 * | 7/2020 | Steeves | H04L 51/224 |
| 2013/0143529 | A1 * | 6/2013 | Leppanen | H04M 1/006 |
| | | | | 455/411 |

(Continued)

OTHER PUBLICATIONS

"Foreign Office Action", EP Application No. 20728355.7, dated Jan. 4, 2023, 10 pages.

(Continued)

*Primary Examiner* — Boris D Grijalva Lobos
(74) *Attorney, Agent, or Firm* — Colby Nipper PLLC

(57) ABSTRACT

The present disclosure provides systems and methods for delivering notifications to a device or accessory based on the context. A host device may be wirelessly coupled to one or more accessories that are available to receive a notification. The host device may analyze a context for transmitting a notification, such as analyzing user attention and accessory state. Analyzing user attention and accessory state may be done by analyzing sensor data, such as audio input, image sensors, proximity sensors, etc. The host device may determine a content type, such as text, e-mail, news, or download, content classification, such as urgent, sensitive, or reminder, and a notification type, such as visual, audio, or haptic. The host device may select at least one of the accessories based on the context. The host device may transmit the notification to the selected accessory.

22 Claims, 9 Drawing Sheets

(56) References Cited

U.S. PATENT DOCUMENTS

| | | | |
|---|---|---|---|
| 2015/0178501 A1 | 6/2015 | Robison et al. | |
| 2015/0338919 A1* | 11/2015 | Weber | H04M 1/72454 345/156 |
| 2016/0028869 A1* | 1/2016 | Bhatt | H04M 1/72412 455/41.2 |
| 2016/0234366 A1* | 8/2016 | De Filippis | H04W 12/33 |
| 2017/0245047 A1* | 8/2017 | Schobel | H04W 76/25 |
| 2017/0289329 A1* | 10/2017 | Yim | H04M 1/72412 |
| 2017/0324790 A1* | 11/2017 | Li | H04L 65/612 |
| 2018/0220427 A1* | 8/2018 | Hwang | H04W 4/06 |
| 2018/0367946 A1* | 12/2018 | Best | H04W 4/021 |
| 2019/0082416 A1* | 3/2019 | DeLuca | H04W 68/005 |
| 2019/0369939 A1 | 12/2019 | Levesque et al. | |
| 2020/0107184 A1* | 4/2020 | Giles | H04W 24/00 |
| 2020/0169633 A1* | 5/2020 | Palin | H04M 1/6066 |
| 2021/0195383 A1* | 6/2021 | Kato | H04W 4/21 |
| 2021/0314768 A1* | 10/2021 | Tome | H04W 12/02 |

OTHER PUBLICATIONS

"International Preliminary Report on Patentability", Application No. PCT/US2020/031829, dated Nov. 8, 2022, 8 pages.

Leonidis, Asterios et al., Ambient Intelligence in the Living Room, published online Nov. 16, 2019, www.ncbi.nlm.nih.gov/pmc/articles/PMC6891285/, 51 pages.

Kubitza, Thomas et al., retrieved from the internet Feb. 18, 2020, http://dx.doi.org/10.1145/2968219.2968545, An IoT Infrastructure for Ubiquitous Notifications in Intelligent Living Environments, Sep. 12, 2016, Heidelberg, Germany, 6 pages.

International Search Report and Written Opinion for International Application No. PCT/US2020/031829 dated Sep. 21, 2020. 13 pages.

\* cited by examiner

NOTIFICATION DELIVERY BASED ON CONTEXT AWARENESS

CROSS-REFERENCE TO RELATED APPLICATION

This application is a national phase entry under 35 U.S.C. § 371 of International Application No. PCT/US2020/031829, filed May 7, 2020, the entire disclosure of which is incorporated herein by reference.

BACKGROUND

Many devices provide for wirelessly connecting to another device, such as an accessory. For example, a smartphone may be connected via short-range wireless pairing to a pair of earbuds or a smartwatch such that the smartphone may output a notification to the earbuds and/or the smartwatch. Each device may handle notifications independently resulting in the smartphone, earbuds, and smartwatch each receiving a notification for the same content. A user may have to interact with the notification on each device to dismiss the notification. This is cumbersome for the user as the user may have dismissed or interacted with the notification on one accessory, such as the smartwatch, but still has to interact with the notification on the smartphone and earbuds. Additionally, the user may be separately interrupted by the notification on each device, such as by receiving audio or haptic alerts on each device.

BRIEF SUMMARY

The present disclosure provides a framework for delivering notifications to a device or accessory based on the context. As used herein, an accessory may be used to refer to any electronic device that is coupled to a host device and capable of providing information in some form, such as audio, visual, haptic feedback, etc., to a user. Examples of accessories may include earbuds, smartwatches, headsets, other wearable electronics, etc. Accessories may further include other electronic devices that a user of the host device has access to, such as a laptop, hub, tablet, etc. For example, a host device may be wirelessly connected to one or more accessories such that the accessories are available to receive a notification transmitted from the host device. To determine which accessory to transmit a notification to, the host device may obtain data from a plurality of sensors. Thus, the host device may analyze the context of the accessories based on the sensor data. For example, the host device may analyze user attention and accessory state. The user attention may include, for example, whether the accessory is being actively used by the user, whether the accessory detects the user's gaze, the pose of the accessory, whether the accessory detects background chatter, and the location of the accessory. The accessory state may include, for example, whether the accessory is on and connected to the host device and the mode of the accessory, such as do not disturb, silent, or haptic. The host device may select one or more of the connected accessories, based on the context, to transmit the notification to. The host device may select a different type of notification, based on the context, for each of the connected accessories. For example, the type of notification may include audio, visual, haptic, etc. Once transmitted, the notification may be dismissed by the user such that dismissing the notification on one accessory dismisses the notification across all devices and accessories.

One aspect of the disclosure provides for a host device comprising a short range communications interface adapted to transmit notifications to one or more accessories, a memory, and one or more processors in communication with the memory and the short range communications interface. The one or more processor may be configured to identify which of the one or more accessories are available to receive a notification, analyze a context for transmitting the notification based on the one or more identified accessories, select at least one of the one or more identified accessories based on the context, and transmit the notification to the selected accessory.

The one or more processors may be further configured to request information from one or more sensors of each available device, the one or more sensors include at least one of (i) an audio input sensor, (ii) an image sensor, (iii) a touch sensor, or (iv) a proximity sensor, receive information from the one or more sensors, and determine, based on the received information, the context including at least one of user attention or an accessory state. User attention may include at least one of (i) active use of at least one of the one or more available accessories, (ii) gaze detection, (iii) pose detection, (iv) conversation detection, or (v) a location of the one or more available accessories. An accessory state may include at least one of (i) do not disturb mode, (ii) silent mode, or (iii) haptic mode.

The one or more processor may be further configured to determine a content type, determine, based on the content type, a content classification, and determine, based on the content type, the content classification, and the one or more identified accessories, a notification type to transmit to the selected accessory. The content type may include at least one of (i) a text message (ii) an e-mail, (iii) an application notification, (iv) a download, or (v) a news update. The content classification may include at least one of (i) urgent, (ii) sensitive, (iii) customary, or (iv) reminder. The notification type may include at least one of (i) a visual notification, (ii) an audio notification, or (iii) a haptic notification.

The one or more processors may be configured to receive content in the form of an electronic message or a data set, wherein the one or more processors are configured to determine the content type based on the received content. The one or more processors may be further configured to determine which of the one or more accessories are private accessories and public accessories. Private accessories may be accessible by a primary user of the device and public accessories are accessible to the primary user of the device and at least one other user.

Another aspect of the disclosure provides for a method of transmitting a notification to a selected accessory. The method includes identifying, by one or more processors of a host device, which of one or more accessories are available to receive a notification, analyzing, by the one or more processors based on the one or more identified accessories, a context for transmitting the notification, selecting, by the one or more processors based on the context, at least one of the one or more identified accessories, and transmitting, by the one or more processors, the notification to the selected accessory.

DETAILED DESCRIPTION

The systems and methods described herein relate to a host device that may simultaneously couple to one or more accessories. As described above, an accessory may refer to any electronic device that is coupled to a host device and capable of providing information in some form, such as audio, visual, haptic feedback, etc., to a user. Examples of accessories may include earbuds, smartwatches, headsets, other wearable electronics, etc. Accessories may further include other electronic devices that a user of the host device has access to, such as a laptop, hub, tablet, etc. The accessories may be coupled to the host device via short-range communication, such as Bluetooth, Bluetooth low energy (BLE), etc. The host device and each of the connected accessories may include one or more sensors. Just as some examples, the sensors may include image sensor(s), a gaze detection sensor(s), audio detection input, touch sensor(s) and/or proximity sensor(s). According to some examples, Bluetooth signal strength analysis or ultra-wide band ("UWB") analysis may be used to detect when an accessory or electronic device is nearby. The sensor data may provide context relating to user attention. User attention may be inferred by, for example, active use of the accessory, detection of a user's gaze, pose data relating to an orientation of the accessory, detection of background chatter thereby alerting the host device that the user may be nearby, and the location of the accessory. Context data may also include information pertaining to the accessory state. For example, the accessory state may include whether the accessory is turned on or off and whether the accessory is set to a certain mode, such as do not disturb, silent, haptic, etc. The host device may analyze the context data to determine which device or accessory to transmit a notification to.

Figure 1:
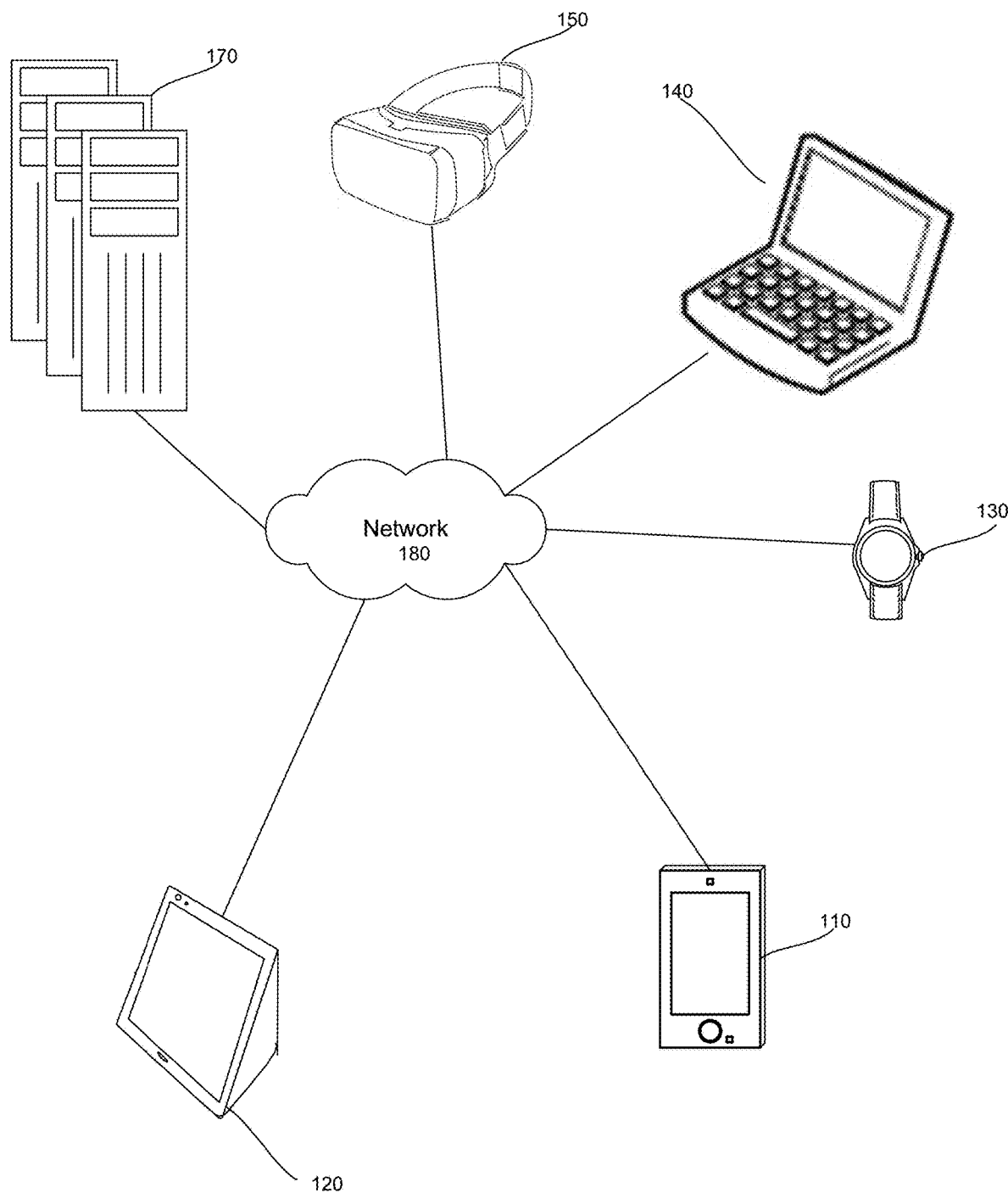
FIG. 1 is a functional diagram of an example system according to aspects of the disclosure.

FIG. 1 illustrates an example system 100 in which the features described herein may be implemented. It should not be considered limiting the scope of the disclosure or usefulness of the features described herein. In this example, system 100 may include a plurality of devices 110, 120, 130, 140, 150, server computing device 170, and network 180. The collection of devices may include, for example, smartphone 110, hub 120, smartwatch 130, laptop 140, and headset 150. For purposes of ease, the collection of devices 110, 120, 130, 140, 150 or a single device will be referenced as device(s) 110.

Each device 110 may be a personal computing device intended for use having all of the components normally used in connection with a personal computing device, as described herein, including a one or more processors (e.g., a central processing unit (CPU)), memory (e.g., RAM and internal hard drives) storing data and instructions, a display (e.g., a monitor having a screen, a touch-screen, a projector, a television, or other devices such as a smartwatch display that is operable to display information), and user input devices (e.g., a mouse, keyboard, touchscreen or microphone).

The devices 110 may each be a mobile computing device capable of wirelessly exchanging data with a server over a network such as the Internet, or a full-sized personal computing device. By way of example only, devices may include mobile phones, wireless-enabled PDAs, tablet PC, a netbook that is capable of obtaining information via the Internet or other networks, wearable computing devices (e.g., a smartwatch, headset, smartglasses, virtual reality player, other head-mounted display, etc.), wireless speakers, home assistants, gaming consoles, etc. In some examples, one or more of the devices 110 may be further wirelessly coupled to an accessory, such as earbuds, smartglasses, etc. Further, such accessory may be indirectly connected to the network 180 through the one or more devices 110.

The devices 110 may be at various nodes of a network 180 and capable of directly and indirectly communicating with other nodes of network 180. Although four (4) devices are depicted in FIG. 1, it should be appreciated that a typical system 100 can include one or more devices, with each computing device being at a different node of network 180. The network 180 and intervening nodes described herein can be interconnected using various protocols and systems, such that the network can be part of the Internet, World Wide Web, specific intranets, wide area networks, or local networks. The network 180 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 100 may include one or more server computing devices having a plurality of computing devices, e.g., a load balanced server farm, that exchange information with different nodes of a network for the purpose of receiving, processing and transmitting the data to and from other computing devices. For instance, one or more server computing devices 170 may be a web server that is capable of communicating with the one or more devices 110 via the network 180. In addition, server computing device 170 may use network 180 to transmit information to one of the other devices 110. Server computing device 170 may include one or more processors, memory, instructions, and data. These components operate in the same or similar fashion as those described herein with respect to device 110. The server computing devices 170 may receive sensor data from devices 110. The server computing devices 170 may determine a context for transmitting a notification by analyzing the sensor data.

Figure 2:
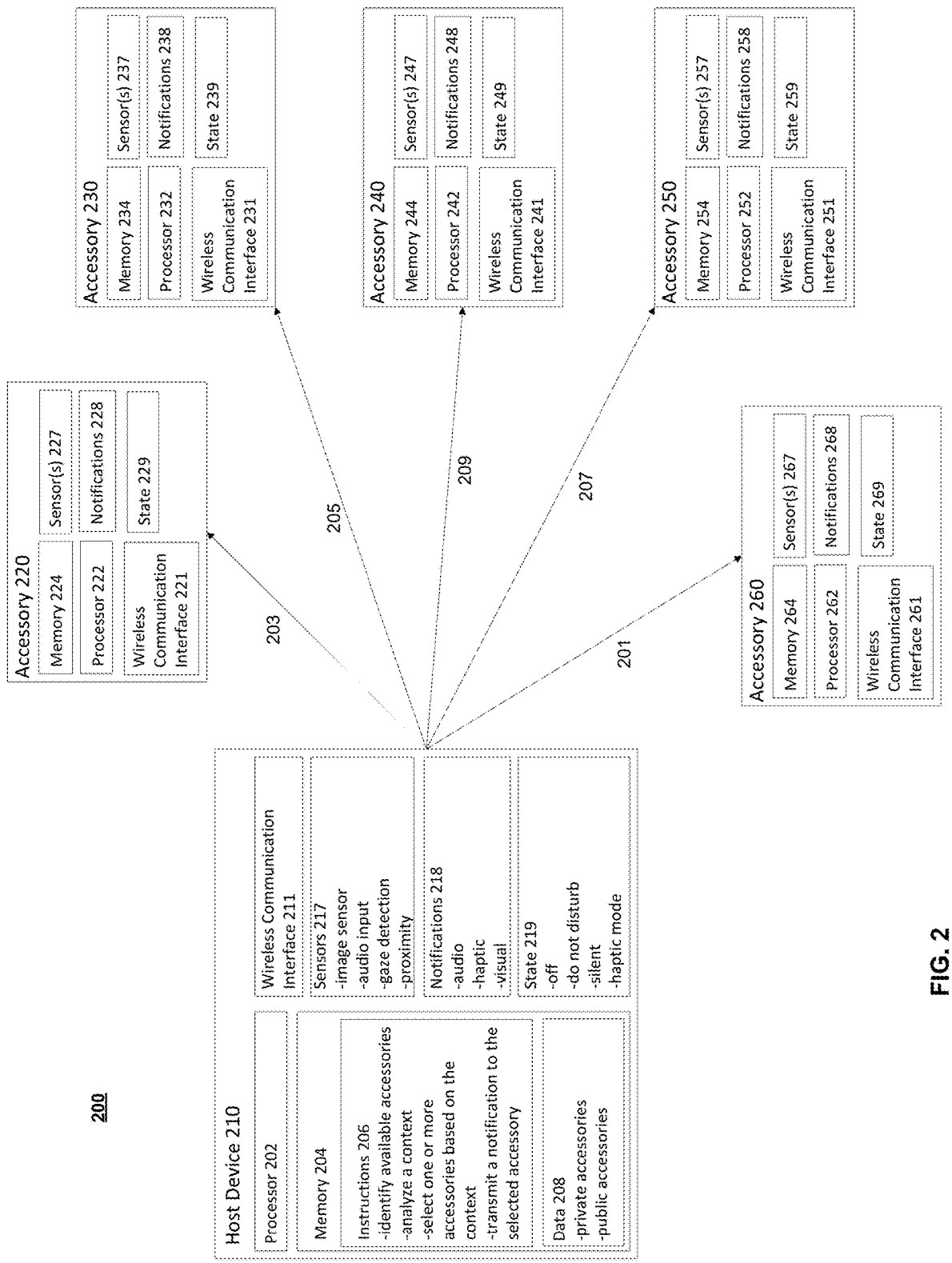
FIG. 2 is a functional block diagram of an example system in accordance with aspects of the disclosure.

FIG. 2 illustrates an example system 200 in which the features described above and herein may be implemented. It should not be considered as limiting the scope of the disclosure or usefulness of the features described herein. In this example, the system 200 may include host device 210 and accessories 220, 230, 240, 250, 260. Host device 210 may contain one or more processors 202, memory 204, instructions 206, data 208, a wireless communication interface or antenna 211, one or more sensors 217, notification capabilities 218, and device state 219. The host device 210 may be able to communicate with accessories 220, 230, 240, 250, 260 via a short-range wireless communication interface.

The one or more processors 202 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of host device 210 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of host device 210. Accordingly, references to a processor or computing device will be understood to include references to a collection of processors or computing devices or memories that may or may not operate in parallel.

Memory 204 may store information that is accessible by the processors, including instructions 206 that may be executed by the processors 202, and data 208. The memory 204 may be a type of memory operative to store information accessible by the processors 202, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 206 and data 208 are stored on different types of media.

Data 208 may be retrieved, stored or modified by processors 202 in accordance with the instructions 206. For instance, although the present disclosure is not limited by a particular data structure, the data 208 may be stored in computer registers, in a relational database as a table having a plurality of different fields and records, XML documents, or flat files. The data 208 may also be formatted in a computer-readable format such as, but not limited to, binary values, ASCII or Unicode. By further way of example only, the data 208 may be stored as bitmaps comprised of pixels that are stored in compressed or uncompressed, or various image formats (e.g., JPEG), vector-based formats (e.g., SVG) or computer instructions for drawing graphics. Moreover, the data 208 may comprise information sufficient to identify the relevant information, such as numbers, descriptive text, proprietary codes, pointers, references to data stored in other memories (including other network locations) or information that is used by a function to calculate the relevant data.

The instructions 206 can be any set of instructions to be executed directly, such as machine code, or indirectly, such as scripts, by the processor 202. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The host device 210 may further include a wireless communication interface 211, such as an antenna, transceiver, and any other devices used for wireless communication. The antenna may be, for example, a short-range wireless network antenna. The host device 210 may be able to be coupled with accessories 220, 230, 240, 250, 260 via wireless connections 203, 205, 209, 207, 201, respectively. For instance, the antenna may be used to transmit and receive Bluetooth signals. There may be a maximum distance between the host device 210 and accessories 220, 230, 240, 250, 260 that would allow host device 210 and accessories 220, 230, 240, 250, 260 to be within range of each other.

The host device 210 may include one or more sensors 217. The sensors may include, for example, image sensor(s), gaze detection sensor(s), audio detection sensor(s), touch sensor(s), and proximity sensor(s). The data obtained by the sensors may be analyzed to determine a context. The context may include user attention and/or accessory state. User attention may include, for example, detection of a user's proximity and/or a user's gaze, detection of background noise, positioning of the host device 210 in comparison to the connected accessories, etc.

The one or more image sensors may convert optical signals into electrical signals to detect, or capture, features and/or objects around host device 210. The one or more image sensors may be, for example, a charge coupled device ("CCD") sensor or a complementary metal oxide semiconductor ("CMOS") sensor. The one or more processors 302 may process the features and/or objects detected by the one or more image sensors to identify at least one detected feature and/or object. The one or more image sensors may be used to detect a user's gaze such that the image sensors also function as a gaze detection sensor. According to some examples, the image sensors may be used to determine the pose of the device.

The audio detection sensor may include, for example, one or more microphones configured to receive audio input signals. The audio input may include background noise, such as music, people talking, etc. The user can enable or disable receiving background noise as audio input, and the device may only receive background noise as audio input if the user has enabled this feature. According to some examples, a user may adjust settings on the device to restrict sharing to particular geographical areas, times, or conditions, such as when the device is within Bluetooth range of a predetermined number of other user devices. Moreover, the user may set the one or more microphones to automatically disable in particular locations. According to some examples, the user may set the device to automatically disable receiving background noise as audio input in particular locations, such as familiar locations. The user may further configure the device to receive audio input without further active input from the user. In some examples, the microphone used for audio detection input may also be used for user input.

The proximity sensor may detect the proximity of the accessory to other devices, such as based on signal strength or other communication parameters.

The sensor data may be analyzed by the host device 210 or another device on the network to determine user attention. Analyzing the sensor data may include, for example, determining whether a user is likely to see, hear, or feel a notification. Additionally or alternatively, analyzing the sensor data may include selecting an accessory to receive a notification. For example, based on the user attention, the host device 210 may transmit a notification to a connected accessory. According to some examples, based on the user attention the host device 210 may output a notification.

Host device 210 may include one or more notification capabilities or settings 218. The notifications may be, for example, audio, haptic, visual, or a combination of audio, haptic, or visual. Audio notifications output by host device 210 may include a noise or a sound that can be heard by the user. Thus, host device 210 may further include one or more outputs, such as speakers. Host device 210 may further include controls to determine a volume level of the audio notification.

The one or more devices states 219 may include, for example, off, do not disturb, silent, haptic mode, etc. For example, when host device 210 is off, host device 210 may be unable to transmit or receive notifications. In some examples, when host device 210 is set to do not disturb, notifications received by host device 210 may not result in a notification provided to the user. When in silent mode, host device 210 may receive content and notifications but may only provide a visual notification. When in haptic mode, host device 210 may receive content and notifications but may only provide a haptic notification. Host device 210 may have a default state which may, for example, allow notifications of any type, including audio, haptic, or visual.

Accessories 220, 230, 240, 250, 260 may each include one or more processors 222, 232, 242, 252, 262, memory 224, 234, 244, 254, 264, wireless communication interface 221, 231, 241, 251, 261, sensors 227, 237, 247, 257, 267, notification capabilities or settings 228, 238, 248, 258, 268, and device state 229, 239, 249, 259, 269, respectively, that are substantially similar to those described herein with respect to host device 210.

Host device 210, or another device on the network, may analyze the sensor data of each of the accessories to determine user attention. The accessories may be ranked based on user attention. A high ranking accessory may be an accessory that the user is likely to hear, see, or feel a notification whereas a low ranking accessory may be, for example, an accessory that the user is not likely to hear, see, or feel a notification. For example, a high ranking accessory may be an accessory that the user is actively using. A low ranking accessory may be an accessory that does not detect the user's presence or gaze.

Analyzing the sensor data may include, for example, determining which, if any, accessory is actively being used. Analyzing the sensor data may also include determining a proximity of the accessory to the host device 210. For example, an accessory that is closer in proximity to the host device 210 may rank higher in user attention than an accessory that is farther away. According to some examples, analyzing the sensor data may include detecting the presence of the user and/or detecting a user's gaze. An accessory that detects the presence of a user and/or the user's gaze using the image sensors may rank higher in user attention than an accessory that does not detect the presence of the user and/or the user's gaze.

Additionally or alternatively, host device, or another device on the network, may analyze the accessory state. Analyzing the accessory state may include determining which accessories are off or which are set to do not disturb, silent, haptic, morning, evening, etc. For example, the host device, a network computing device, or another device on the network may send a request to each accessory for the status of the accessory. The accessory may respond to the request with an indication of the accessory state. Additionally or alternatively, accessories that are not reachable by a status request may be determined to be offline and/or off. Accessories that are off may be excluded from the list of available accessories to receive a notification. According to some examples, the accessory state may be set by a user. In some examples, an application on the host device may be used to specific notification settings for the connected accessories. In another example, a cloud managed state system may be used to determine the accessory state. For example, each accessory may access a cloud managed account that includes the accessory state for each accessory.

The accessory state may be used as a factor for determining which accessory to transmit a notification to. The accessory state, such as do not disturb, morning, evening, etc., may result in each accessory responding differently and, therefore, may affect the accessory's ranking for transmitting a notification to. For example, accessories that are set to do not disturb may rank lowest for transmitting a notification to. According to some examples, the host device may determine an accessory set to silent may only receive a visual notification. In some examples, when the accessory is set to haptic mode, the host device may determine the accessory can receive a visual and haptic notification.

User attention and accessory state may determine a context for host device to transmit a notification to one of the accessories. The context may, for example, determine which accessory a user will most likely see, hear, or feel a notification. Based on the user attention and/or accessory state, host device 210, or another device on the network, may determine which accessory to receive a notification.

Figure 3:
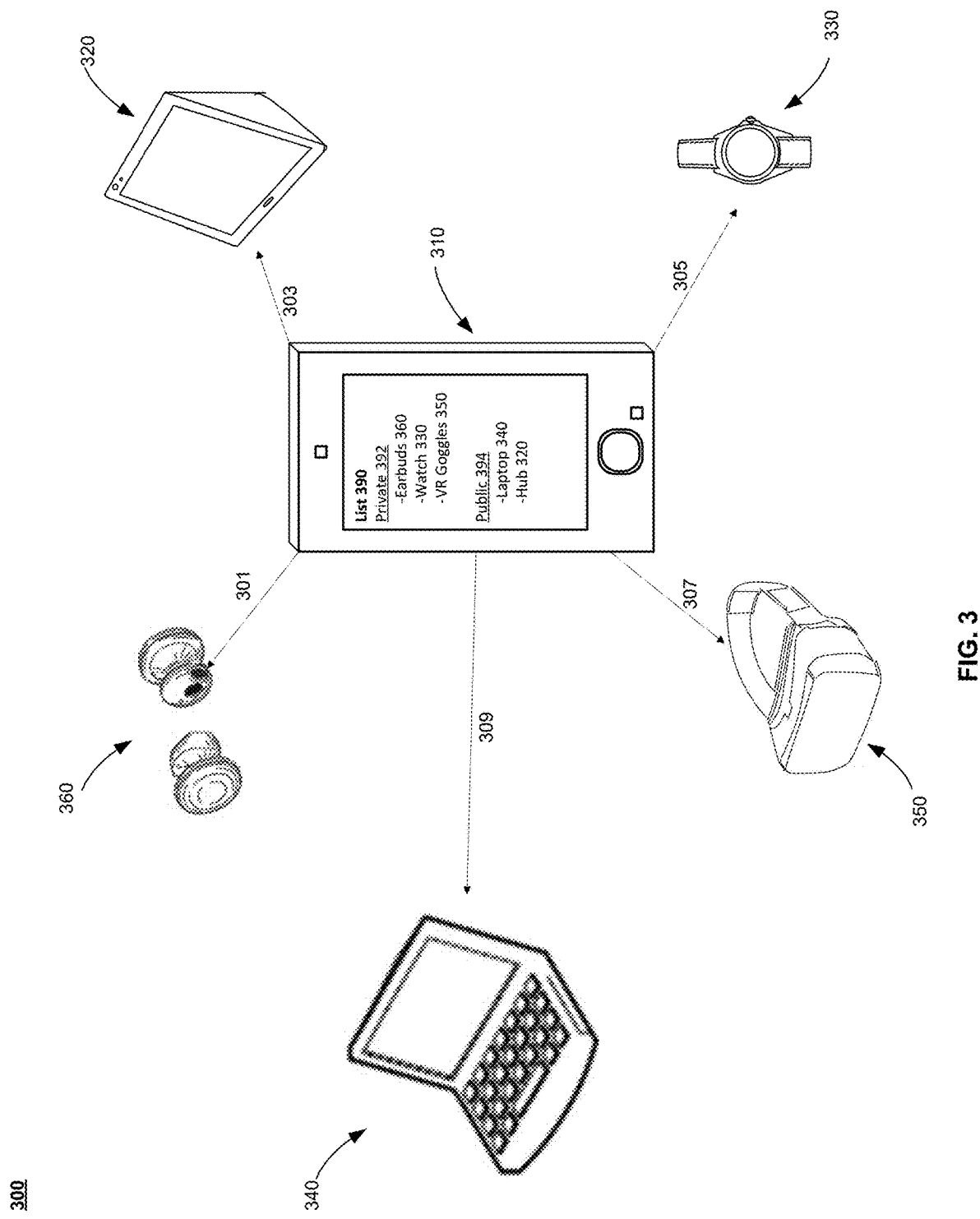
FIG. 3 is a pictorial diagram of an example system in accordance with aspects of the disclosure.

FIG. 3 illustrates an example system 300 of a host device and a plurality of accessories connected via a short-range communications interface. The host device may categorically store paired accessories. Once the host device identifies which accessories are connected, the host device may categorize the connected accessories based on whether the accessories are private or public. For example, a private accessory may be an accessory that is intended for use by the user of the host device only, whereas a public accessory may be an accessory that is intended for use by the user of the host device as well as other individuals. In further examples, the accessories may be further categorized based on user preference, the type of accessory, etc.

The host device may be, for example, a smartphone 310, or any of a variety of other host devices, such as laptops, gaming systems, tablets, etc. Smartphone 310 may have a short-range wireless communications interface. The short-range communications interface may include, for example, a wireless network antenna, transceiver, etc. The short-range communications interface may allow smartphone 310 to wirelessly connect to the accessories. The accessories may include a home assistant hub 320, a smartwatch 330, a laptop 340, an augmented reality and/or virtual reality headset 350, and a pair of earbuds 360, or any of a variety of other accessories, such as fitness trackers, wireless speakers, glasses, head-mountable displays, tablets, game consoles, motorcycle helmets, etc. Each accessory may include a short-range communications interface that allows the accessory to be coupled to the host device. The wireless coupling may be established using any of a variety of techniques, such as Bluetooth, Bluetooth low energy (BLE), etc. The accessories may be categorized as private or public. According to some examples, the accessories may be categorized based on user input.

The host device may be wirelessly connected to one or more accessories simultaneously. For example, smartphone 310 may be connected to earbuds 360 via wireless connection 301, to hub 320 via wireless connection 303, to smartwatch 330 via wireless connection 305, to laptop 340 via wireless connection 309, and to headset 350 via wireless connection 307. According to some examples, smartphone 310 may be wirelessly connected to hub 320, smartwatch 330, laptop 340, headset 350, and earbuds 360 simultaneously when such accessories are within the range of the wireless network antenna. In some examples, smartphone 310 may only be connected to earbuds 360 and smartwatch 330, for example, due to a range of its wireless network antenna. Thus, smartphone 310 may be wirelessly coupled to any number of accessories within range of its wireless network antenna.

Smartphone 310 may store a categorical list 390 of the connected accessories. Just as one example, the list 390 may identify devices as private devices 392 and public devices 394. A private accessory may be an accessory that typically outputs content only to a primary user. The primary user may be determined based on a user profile that was set up on the host device during the out of box experience. According to some examples, earbuds or a smartwatch may be a private accessory. For example, earbuds or smartwatch may be accessories that are only used by the primary user. Thus, content or notifications transmitted to the earbuds or smartwatch may only be received by the primary user. A public, or shared, accessory may be an accessory that typically outputs content to anyone within audio, visual, or other output range of the accessory. By way of example, wireless speakers or displays, short-range wireless stereos, etc. may be shared accessories.

The list 390 may, in some examples, include identifiers indicating how each accessory is categorized. The identifier may be, for example, a color, an icon, text, placement of the accessory name in a particular section, heading, sub-list, etc. According to some examples, the list 390 may be determined by user input. For example, the user may provide a designation of each device or accessory after that device or accessory is connected to the host device. The list 390 may be modified by a user such that the user may change the designation of devices, add devices, or remove devices at any time.

As shown in system 300, smartphone 310 may categorically store the connected earbuds 360, hub 320, smartwatch 330, headset 350, and laptop 340. For example, smartphone 310 may categorize earbuds 360, smartwatch 330, and headset 350 as private accessories 392 and may categorize hub 320 and laptop 340 as public accessories 394.

Figure 4:
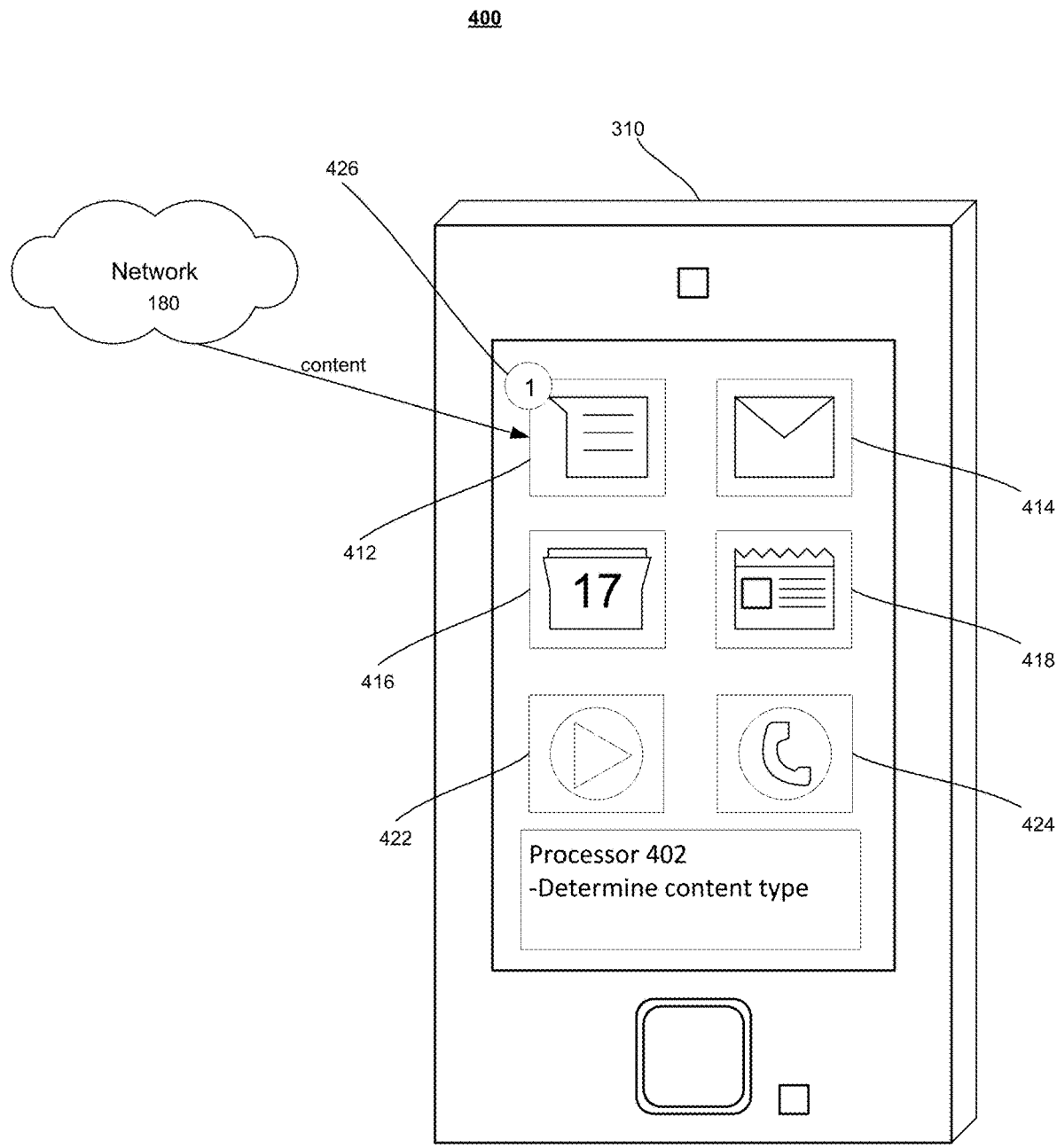
FIG. 4 is a pictorial diagram of an example system in accordance with aspects of the disclosure.

FIG. 4 illustrates a system in which the context of the host device and one or more accessories may be analyzed. The context may include user attention and accessory state. According to some examples, the host device, server computing device, or another device connected to the network may analyze the context data. Analyzing context data may include, for example, analyzing sensor data collected by each of the accessories.

User attention may be inferred by, for example, active user of the host device and/or accessory, detection of a user's gaze by the host device and/or accessory, pose data pertaining to the device or accessory, whether the host device or accessory picks up background chatter, the proximity of the accessory to the host device, etc. Data pertaining to user attention may be determined based on the data from the one or more sensors of the host device or accessory. The data may be transmitted or shared over the network to the host device, a server computing device, or another device on the network to be analyzed.

An accessory state may be inferred by, for example, whether the accessory is turned on or off, whether the accessory is set to do not disturb, silent, haptic mode, etc. Data pertaining to the accessory state may be transmitted to the host device, the server computing device, or another device on the network to be analyzed.

The data may be collected from the host device and accessories and shared via the network. The host device may analyze the context data to determine a context for delivering a notification to the host device and/or at least one accessory. According to some examples, the data may be analyzed by the server computing device or another device on the network.

The host device may rank the available accessories based on each accessory's respective context data. The rank may, in some examples, determine the accessory to which the host device will transmit a notification. For example, the sensor data and accessory state may be analyzed to determine a rank of each accessory. According to some examples, an accessory that is closer in proximity to the host device may be ranked higher than an accessory that is located further away. An accessory that is actively being used may be ranked higher than an accessory that is off or set to do not disturb. An accessory that detects the presence of the user and/or the user's gaze may be ranked higher than an accessory that does not detect the presence of the user and/or the user's gaze.

According to some examples, the context data may also be analyzed to rank each accessory based on the determined type of notification to be transmitted. For example, an accessory that detects the presence of the user and/or the user's gaze may be ranked higher for receiving a visual notification as the user may easily see the notification if sent to that accessory. An accessory that is on the user or being worn by the user may be ranked higher for receiving a haptic notification than an accessory that is located at a distance from the user as the user may easily feel the notification.

FIG. 4 illustrates a system in which the host device receives content and determines a content type. The host device may receive content that is sent from another device, sent from an application, sent via server computing device over the network, etc. For example, the content may be received in the form of an electronic message or a data set received by the host device. The one or more processors of the host device may determine, based on the received content, a content type. The content type may include, for example, text message, e-mail, calendar notifications and/or reminders, news updates, application updates, a phone call, etc. According to some examples, determining the content type may include determining an application that has received content. For example, text messages may be received in a message application, e-mails may be received in an e-mail application, calendar content may be from a calendar application, news content may be received in a news application, application content may be from an application or play store, etc. Once content is received, an indication may appear on the application. According to some examples, the server computing device or another device connected to the network may determine the content type.

System 400 may include a host device, such as smartphone 310, connected to network 180. Smartphone 310 may include a plurality of applications, such as messages 412, e-mail 414, calendar 416, news 418, application store 422, phone 424, games, social media applications, etc. The applications may receive content intended for output to the user. For example, the messages application 412 may receive text, picture, or video messages, the e-mail application 414 may receive e-mails with a variety of content intended for the user, the calendar application 416 may receive invitations or reminders, the news application 418 may receive real-time content, the application store 422 may receive updates to the applications on smartphone 310, and phone 424 may receive video and/or voice calls.

Smartphone 310 may receive content, such as a text message, sent via network 180. The one or more processors 402 of smartphone 310 may determine that the content is a text message and, therefore, should appear in the messages application 412. The smartphone 310 may provide an indication 426 that the smartphone 310 has received content. The indication 426 may be provided on the messages application 412 thereby indicating that the content is a text message.

Figure 5:
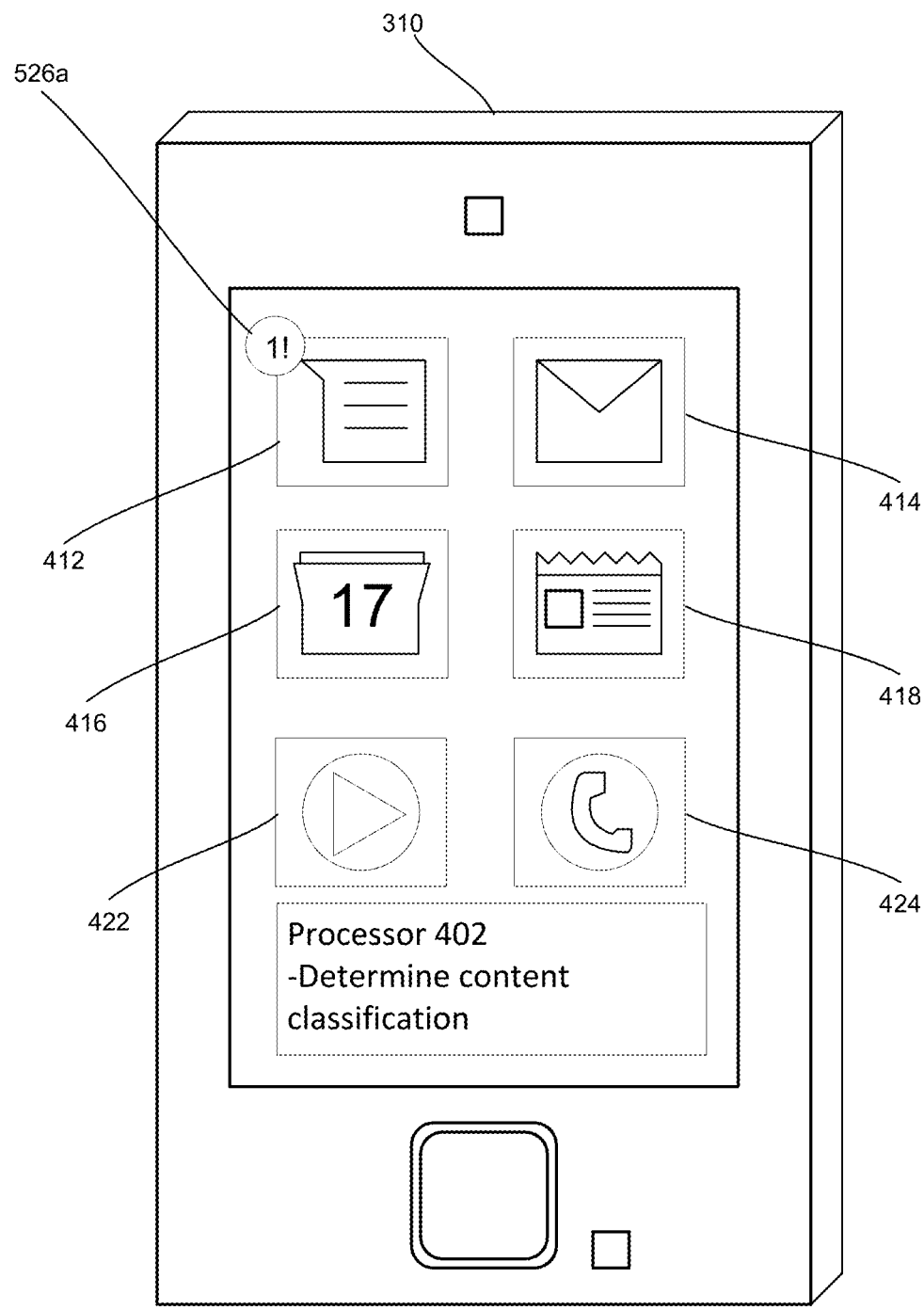
FIG. 5 is a pictorial diagram in accordance with aspects of the disclosure.

FIG. 5 illustrates a system in which the one or more processors of the host device determines a content classification of the received content. The content classification may include designating the content as urgent, sensitive, reminder, customary, etc. According to some examples, the server computing device or another device connected to the network may determine the content classification of the content received by the host device. Additionally or alternatively, the content type may be set by the user for each application. For example, content received by the text message application may be indicated as urgent, which updates from a news application may be considered customary.

Urgent content may be content sent from specific people or applications that may be automatically selected or designated by the user of the host device. For example, the host device may determine a list of top ten (10) people from the contact list that the user communicates. Any content sent from those top ten people may be designated as urgent. According to some examples, the list may be five (5) designated people, twelve (12) designated people, twenty (20) designated people, twenty-five (25) designated people, etc. Therefore, a list of ten people is merely one example and is not meant to be limiting. According to some examples, urgent content may be determined based on the semantic analysis of the content and the source of the content. For example, a message from the user's manager reading "Can you talk now about project X?" may be classified as urgent.

Sensitive content may include content that requires privacy, such that it should only be provided to a user of the host device as opposed to other individuals in the company of the user. According to some examples, sensitive content may be any content received by the host device by certain applications or profiles. For example, content received by the host device for a work profile may automatically or selectively be set to sensitive. According to some examples, sensitive content may be, for example, more or less sensitive based on the context. For example, content from particular users or contacts may be considered sensitive when in a public location but may not be considered sensitive when at the user's home. In one example, a message from a primary contact about a grocery list may be public content when in the user's home but may be classified as private when in a public location, such as work.

Reminders may be content received by the host device based on a certain date or time. For example, the calendar application may provide reminder content regarding a scheduled appointment, meeting, gathering, etc. According to some examples, the e-mail application may provide reminder content regarding a follow-up e-mail.

Customary content may be any content received by the host device that is not designated as urgent, sensitive, reminder, etc.

The one or more processors 402 may determine the content classification based on the received content. For example, the received content may be a text message, as shown by indication 526a on the messages application 412. The one or more processors 402 may determine whether that text message is urgent, sensitive, customary, or reminder content. For example, the content may be classified as urgent. The indication 526a may include a symbol showing the content as urgent. For example, indication 526a may include an exclamation mark (!) to show that the content is urgent.

Figure 6:
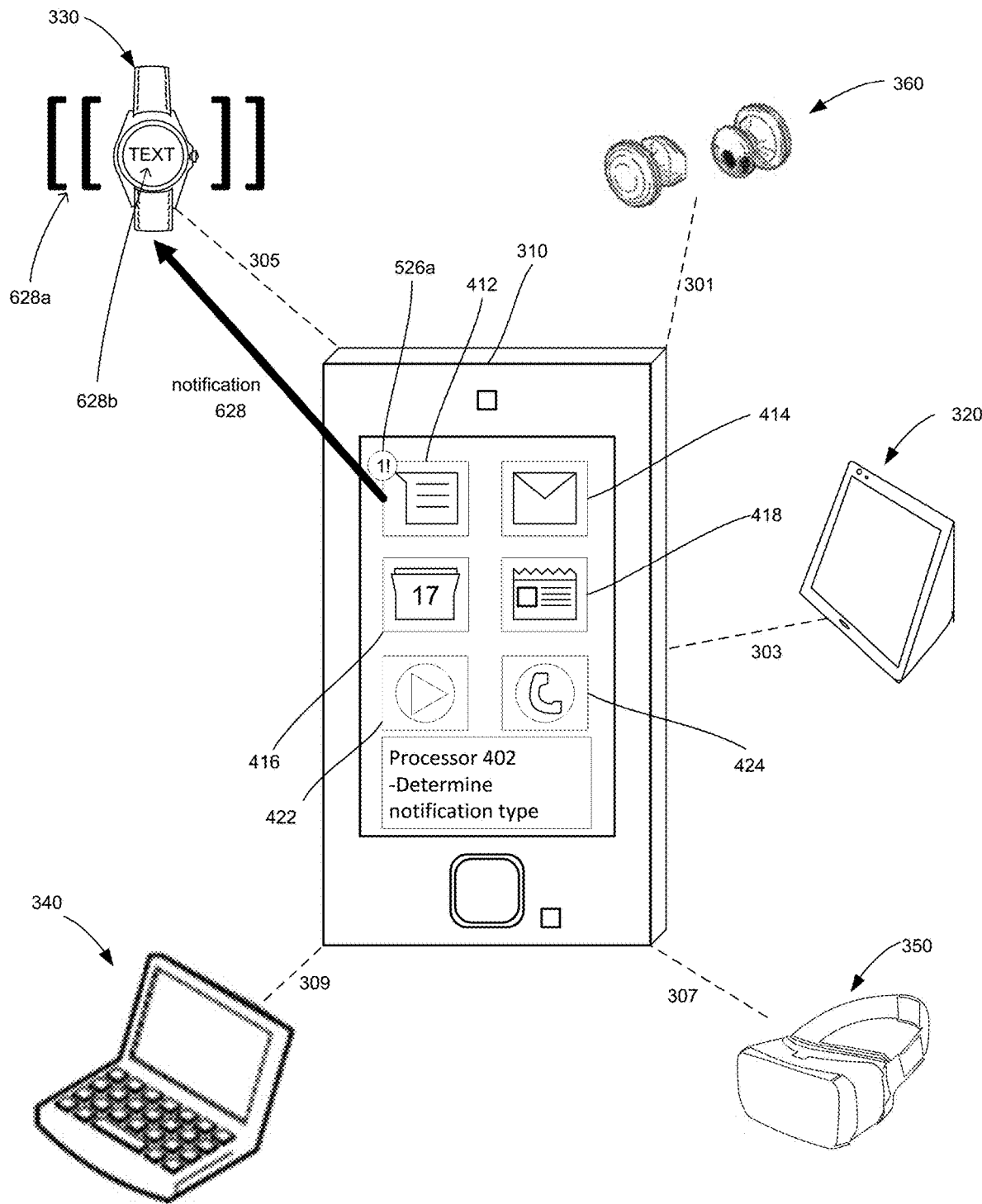
FIG. 6 is a pictorial diagram of an example system in accordance with aspects of the disclosure.

FIG. 6 illustrates a system in which the host device, using one or more processors, may determine a notification type. The notification type may be determined based on one or more of the analyzed context data, the determined content type, and the determined content classification. The notification type may be, for example, any one of or a combination of a haptic, audio, or visual notification. The host device, using the one or more processors, may also determine which accessory to transmit to the notification to.

According to some examples, the host device, the server computing device, or another device on the network may include an algorithm that determines which accessory to receive the notification. The algorithm may be based on the context data collected from the plurality of sensors, the content type, the content classification, and/or the notification type. Additionally or alternatively, a mesh network that hosts the host device and the one or accessories may include the algorithm to determine which accessory to receive the notification. In some examples, the mesh network may be a local mesh network.

For example, a notification for urgent content may be transmitted to an accessory with one or more notification type abilities. Urgent content may cause the host device to transmit a haptic, audio, and visual notification to alert a user of the content. Additionally or alternatively, the host device may transmit the notification regarding the urgent content to an accessory that is currently being used and/or looked at. For example, if an accessory detects the user's gaze, the host device may transmit the notification to that accessory as it is likely the user will see the notification.

According to some examples, a notification for sensitive content may be transmitted to a private accessory in an attempt to ensure that only the user of the host device receives the sensitive content.

A notification for reminder content may be transmitted to an accessory with audio and visual notification capabilities. For example, the audio notification may draw the attention of the user and the visual notification may provide the reminder.

A notification for a customary reminder may be transmitted to any accessory, regardless of whether the accessory has been classified as private or public. The notification type for customary content may be based upon the available accessories. In some examples, the notification type may be a combination of notification types.

While not described, any number of combinations of notification types may be transmitted from the host device to an accessory based on one or more of the analyzed context data, the determined content type, and the determined content classification. Thus, the examples provided herein are not intended to be limiting.

The one or more processors 402 of smartphone 310 may determine a notification type to transmit. For example, the one or more processors 402 may determine whether to transmit a haptic, audio, visual, or combination notification. The notification type may be determined based on one or more of the context data, the content type, the content classification, and the available accessories.

As shown by indication 526a, the message application 412 has received urgent content. The one or more processors 402, based on the context data, content type, available accessories, and/or content classification, may determine a notification type. For example, the processors 802 may determine to transmit a haptic and visual notification based on the content being a text message, the text message being urgent, and the notification capabilities of the available accessories.

Once the notification type has been determined, smartphone 310 may determine which accessory to transmit the notification to. Smartphone 310 may transmit the notification to at least one of smartwatch 330, earbuds 360, hub 320, headset 350, and laptop 340 as those accessories are wirelessly connected to smartphone 310. As the content was determined to be urgent content, smartphone 310 may transmit the notification to a private accessory, such as smartwatch 330 or earbuds 360. Further, as the content was received by the messages application 412, the smartphone 310 may determine to transmit at least a visual notification. The visual notification may include a preview of the content. As shown, smartphone 310 may transmit the notification 628 to smartwatch 330. The notification 628 may include a haptic notification 628*a* and a visual notification 628*b*.

Figure 7:
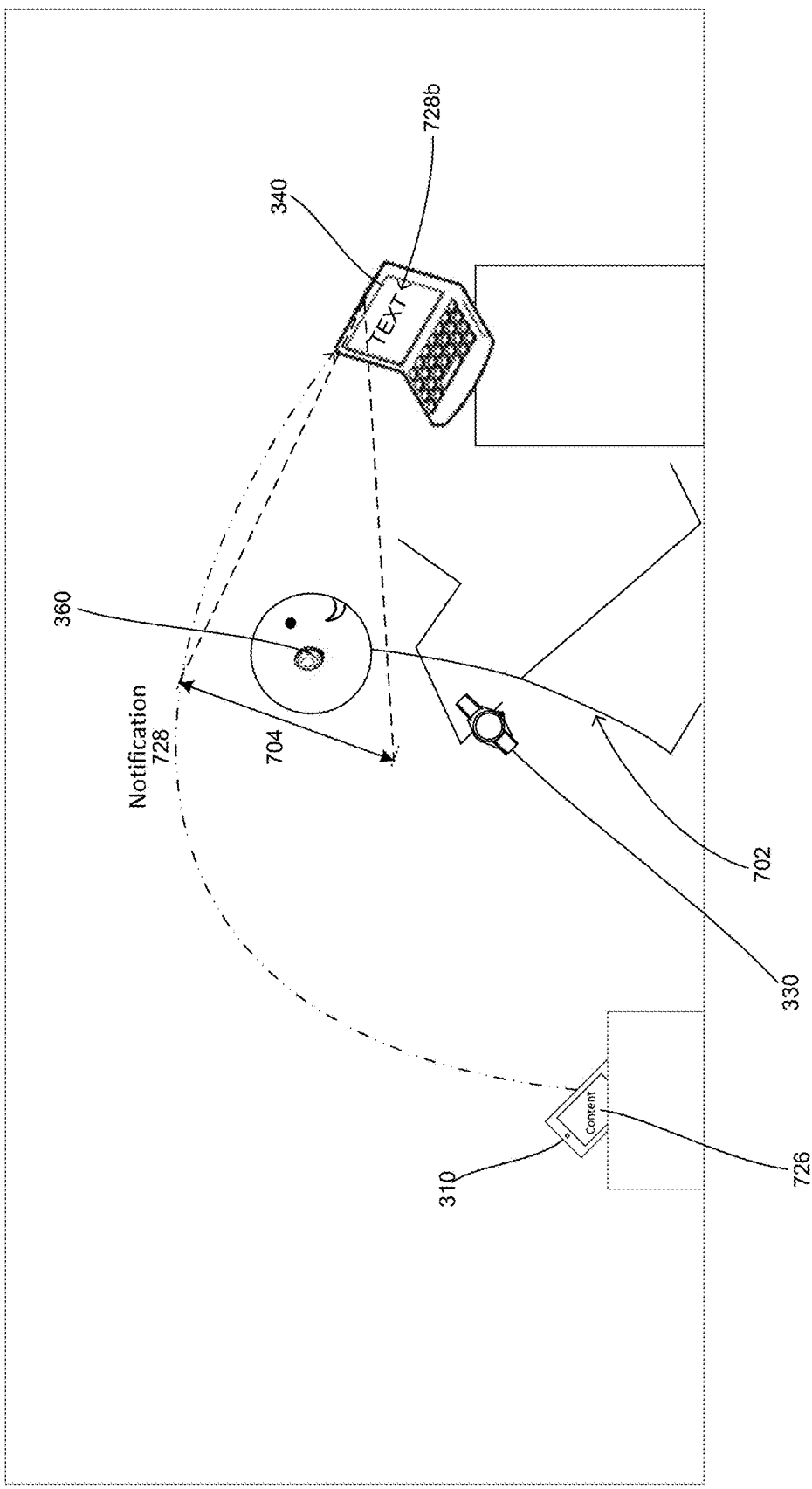
FIG. 7 is a pictorial diagram illustrating an example use of the system according to aspects of the disclosure.

FIG. 7 illustrates an example where a host device determines which accessory to send a notification to based on one or more of the analyzed context data, the determined content type, the determined content classification, the determined notification type, and the available accessories.

As shown in FIG. 7, smartphone 310 may not be being actively used by user 802. For example, smartphone 310 may be in a bag or backpack at the feet of or behind the user 702. Smartphone 310 may receive content 726.

Smartphone 310 may identify which accessories are available to receive a notification. Thus, smartphone 310 may identify smartwatch 330, earbuds 360, and laptop 340 as available accessories as they may be wirelessly connected to smartphone 310. Smartphone 310 may categorize the accessories as public or private. A public accessory may be an accessory in which notifications and content may be accessible to individuals in addition to the smartphone user. A private accessory may be an accessory in which notifications and content may be accessible to only the smartphone user. For example, the smartwatch 330 and earbuds 360 may be categorized as private accessories as the content and/or notification may only be accessible to user 702 whereas laptop 340 may be categorized as a public accessory as individuals other than user 702 may be able access, see, or hear the content and/or notification.

Smartphone 310 may analyze a context for transmitting the notification based on the available accessories. Context data may be analyzed by smartphone 310, a server computing device, or another device on the network based on data from one or more sensors of each of the accessories. The context may provide a framework for determining a relevant, available, or accessible accessory to transmit a notification to. The context may include at least one of user attention or accessory state. User attention may include whether the accessory is being actively used, whether the accessory detects the gaze of a user, the pose of the accessory, whether the accessory detects background chatter, the location. The accessory state may include whether the accessory is turned on or off and/or whether the accessory is set to a certain mode, such as do not disturb, silent, haptic, etc.

For example, the smartwatch 330 may detect that it is being worn by user 702. However, the pose of smartwatch 330 may be such that the display is not facing the user 702. Earbuds 360 may detect that they are being worn by user 702. Laptop 340 may have an image sensor with a field of view 704. The image sensor may detect the presence of user 702 within field of view 704. Additionally or alternatively, the image sensor may detect the gaze of user 702 when user 702 is looking at laptop 340.

Smartphone 310 may select at least one or more of smartwatch 330, earbuds 360, and laptop 340 based on the context. For example, smartphone 310 may rank smartwatch 330, earbuds 360, and laptop 340 based on the context data. Laptop 340 may be ranked highest as user 702 is actively engaging with and, therefore, gazing at the display of laptop 340. Earbuds 360 and smartwatch 330 may be ranked below laptop 340. For example, smartwatch 330 may be ranked lower than laptop 340 as the display of smartwatch 330 is facing away from user 702. Thus, user 702 may not be actively engaging with smartwatch 330, further leading to a lower rank. Earbuds 360 may be ranked lower than laptop 340 as user 702 may not be actively engaging with earbuds 360.

Smartphone 310 may select which accessory to transmit a notification to based on the content type. For example, a notification for a phone call may be transmitted to earbuds 360 even though earbuds 360 may be ranked lower than laptop 340. Earbuds 360 may be best suited for user 702 to interact with the notification, such as by answering the call. A notification for a text message may be transmitted to smartwatch 330 even though smartwatch 330 may be ranked lower than laptop 340. A notification for an email may be transmitted from smartphone 310 to laptop 340. According to some examples, laptop 340 may be best suited for user 702 to interact with the notification, such as by replying to the email.

In some examples, smartphone 310 may select which accessory to transmit the notification to based on the content classification. For example, the content may be classified as urgent, sensitive, customary, reminder, etc. Smartphone 310 may transmit a notification for urgent content to an accessory that user 702 is currently engaging with to ensure that user 702 receives the notification. For example, a notification for urgent content may be transmitted to laptop 340 based on the image sensor detecting the user's gaze. Thus, user 702 may be likely to see the notification on laptop 340. Smartphone 310 may transmit a notification for sensitive content to a private accessory that is accessible or viewed only by user 702. For example, the notification may be transmitted to earbuds 360 or smartwatch 330. Smartphone 310 may transmit a notification for customary or reminder content to any accessory, regardless of whether the accessory is categorized as private or public.

Smartphone 310 may select a notification type to transmit to the accessory. For example, earbuds 360 may be capable of receiving audio and/or haptic notifications, laptop 340 may be capable of receiving audio and/or visual notifications, and smartwatch 330 may be capable of receiving audio, visual, and/or haptic notifications.

After analyzing the context data, content type, content classification, and/or notification type, smartphone 310 may transmit a notification 726 for content 726 to laptop 340. As laptop 340 may detect the gaze of the user, the notification 728 may be a visual notification 728*b*. The visual notification 728 may be a text box or a pop-up on the laptop 340 display.

The laptop 340 may receive an input from the user in response to the notification 728, 728*a*. For example, laptop 340 may receive a command to ignore, dismiss, mute, respond, etc. The input received by the laptop 340 with regards to notification 728, 728*a* may be executed on the laptop 340, as well as the host device 310, smartwatch 330, earbuds 360, etc. even if the notification 728, 728*a* was not sent to those devices. For example, laptop 340 may receive an input to dismiss notification 728, 728a, the content and/or notification on smartphone 310 may also be dismissed. Additionally or alternatively, laptop 340 may receive an input to dismiss the notification 728, 728a, and, therefore, smartwatch 330 may dismiss the content and/or notification, even though a notification was never presented to user 702 on smartwatch 330. Thus, an input received on the accessory receiving the notification will be executed across all devices and accessories that are coupled.

Figure 8:
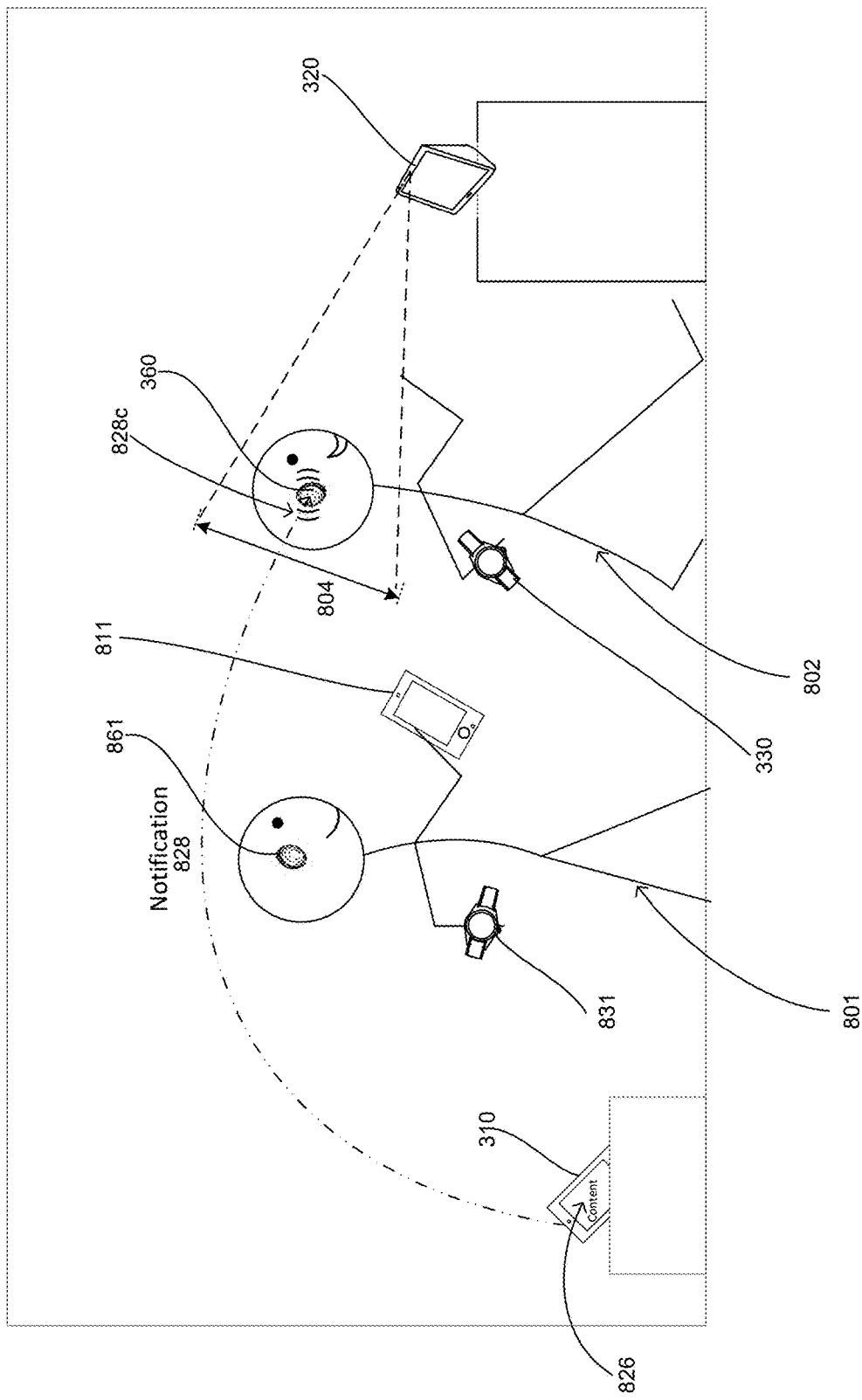
FIG. 8 is a pictorial diagram illustrating another example use of the system according to aspects of the disclosure.

FIG. 8 illustrates another example where a host device determines which accessory to transmit a notification to. For example, there may be a host device, such as smartphone 310, and a host device user 802. Host device user 802 may be wearing smartwatch 330 and earbuds 360. Host device user 802 may be looking at or interacting with hub 320. Smartphone 310 may be wirelessly connected to smartwatch 330, earbuds 360, and hub 320. Smartphone 310, smartwatch 330, earbuds 360, and hub 320 may also be connected to a network. Thus, smartphone 310, smartwatch 330, earbuds 360, and hub 320 may transmit and receive content from each other via the wireless communications interface and/or via the network.

An additional user 801 may be nearby host device user 802. The additional user 801 may have their own host device, such as smartphone 811, smartwatch 831, and earbuds 861. Smartphone 811 may be wirelessly connected to smartwatch 831 and earbuds 861. Smartphone 811, smartwatch 831, and earbuds 861 may not be, according to some examples, wirelessly connected to hub 320. The additional user 801 may be able to view or interact with hub 320 even when the additional user's devices are not connected with hub 320.

Smartphone 310 may be in a bag or backpack located at a distance from user 802. Thus, user 802 may not be currently interacting with, using, or able to view content on smartphone 811. Smartphone 310 may, however, receive content 826. Smartphone 310 may determine to transmit a notification to an accessory to notify user 802 of the received content 826.

Smartphone 310 may identify which accessories are available to receive a notification. For example, smartphone 310 may identify that it is wirelessly connected to earbuds 360, smartwatch 330, and hub 320 and, therefore earbuds 360, smartwatch 330, and hub 320 are available accessories. Smartphone 310 may identify smartwatch 831, earbuds 861, and smartphone 811 as accessories capable of coupling but are not wirelessly connected to smartphone 310 and, therefore, are not available accessories.

Smartphone 310 may analyze the context for transmitting the notification. The context may include user attention and/or accessory state. User attention and accessory state may be based on, for example, data collected by sensors on each of the accessories. For example, the accessories may have an audio input sensor, an image sensor, a proximity sensor, etc. The sensors may, for example, detect user attention attributes, such as whether the accessory is actively being used, detect the gaze of users nearby, detect the pose of the accessory, detect background noise, compare the location of the accessory to the location of the host device, etc. According to some examples, each accessory, hub 320, earbuds 360, and smartwatch 330 may be set to a certain state, or mode, such as do not disturb, silent, haptic, etc. The sensor data and current state of the accessory may be analyzed by smartphone 310 or a server computer to determine the user attention and/or accessory state with respect to hub 320, earbuds 360, and smartwatch 330.

Hub 320 may have one or more image sensors that may detect objects within the field of view 804 of the image sensor. As shown, both host device user 802 and additional user 801 may be within the field of view 804 of the image sensor of hub 320. Thus, hub 320 may detect the presence of users 802, 801. Hub 320 may also include one or more audio input sensors, such as a microphone. The microphone may detect the lull of chatter in the background, thereby indicating that users 802, 801 are present. Hub 320 may additionally or alternatively include a proximity sensor to determine its proximity to smartphone 310.

Earbuds 360 may include one or more audio input sensors, such as a microphone, to pick up background noise. The background noise may include, for example, the lull of chatter, music playing, etc. The background noise may indicate that someone, other than user 802, is nearby.

Smartwatch 330 may include a sensor to determine whether smartwatch 330 is being worn by user 802. Smartwatch 330 may also include a proximity sensor. The proximity sensor may determine the proximity of the smartwatch 330 to smartphone 310.

Smartphone 310 may determine a type of content. For example, smartphone 310 may determine whether it has received a text, e-mail, news update, application update, phone call, etc. Once the content type is determined, smartphone 310 may determine a content classification, such as whether the content is urgent, sensitive, customary, a reminder, etc. Based on the type of content, the content classification, and/or the notification capabilities of the available accessories, smartphone 310 may determine a notification type. For example, hub 320 may be capable of audio and/or video notification, smartwatch 330 may be capable of audio, visual, and/or haptic notifications, and earbuds 360 may be capable of audio and/or haptic notifications.

According to some examples, content 826 may be an incoming phone call intended for user 802. Smartphone 310 may analyze the context for transmitting a notification regarding a phone call. For example, sensor data from hub 320 may indicate that there are at least two users 802, 801 present based on the field of view 804 of the image sensors. Sensor data from smartwatch 330 may indicate that user 802 is not actively engaging with smartwatch 330 based on its pose data. Additionally or alternatively, sensor data from smartwatch 330 may indicate that there is at least one additional user 801 present due to the background noise picked up by the microphones. Earbuds 360 may recognize that they are currently being worn by user 802. As content 826 is a phone call, earbuds 360 may allow user 802 to easily interact with a notification. For example, earbuds 360 may be used by user 802 to have a conversation after answering the call.

Smartphone 310 may transmit a notification 828 to earbuds 360. The notification 828 may be an audio notification 828c that can be heard by user 802 wearing earbuds 360. The notification 828, 828c may alert user 802 of the phone call received by smartphone 310.

Earbuds 360 may receive an input by user 802 to respond to the notification. For example, the user may provide a touch input, such as a swipe, to answer the phone call or dismiss the phone call. The input provided by the user may be applied to any other devices that may have received the content 826 and/or notification. Thus, user 802 answering the call on earbuds 360 would remove the content 826 and/or notification from smartphone 310. Additionally or alternatively, user 802 answering or dismissing the call on earbuds 360 would remove the content 826 and/or notification from smartwatch 330 and hub 320.

Figure 9:
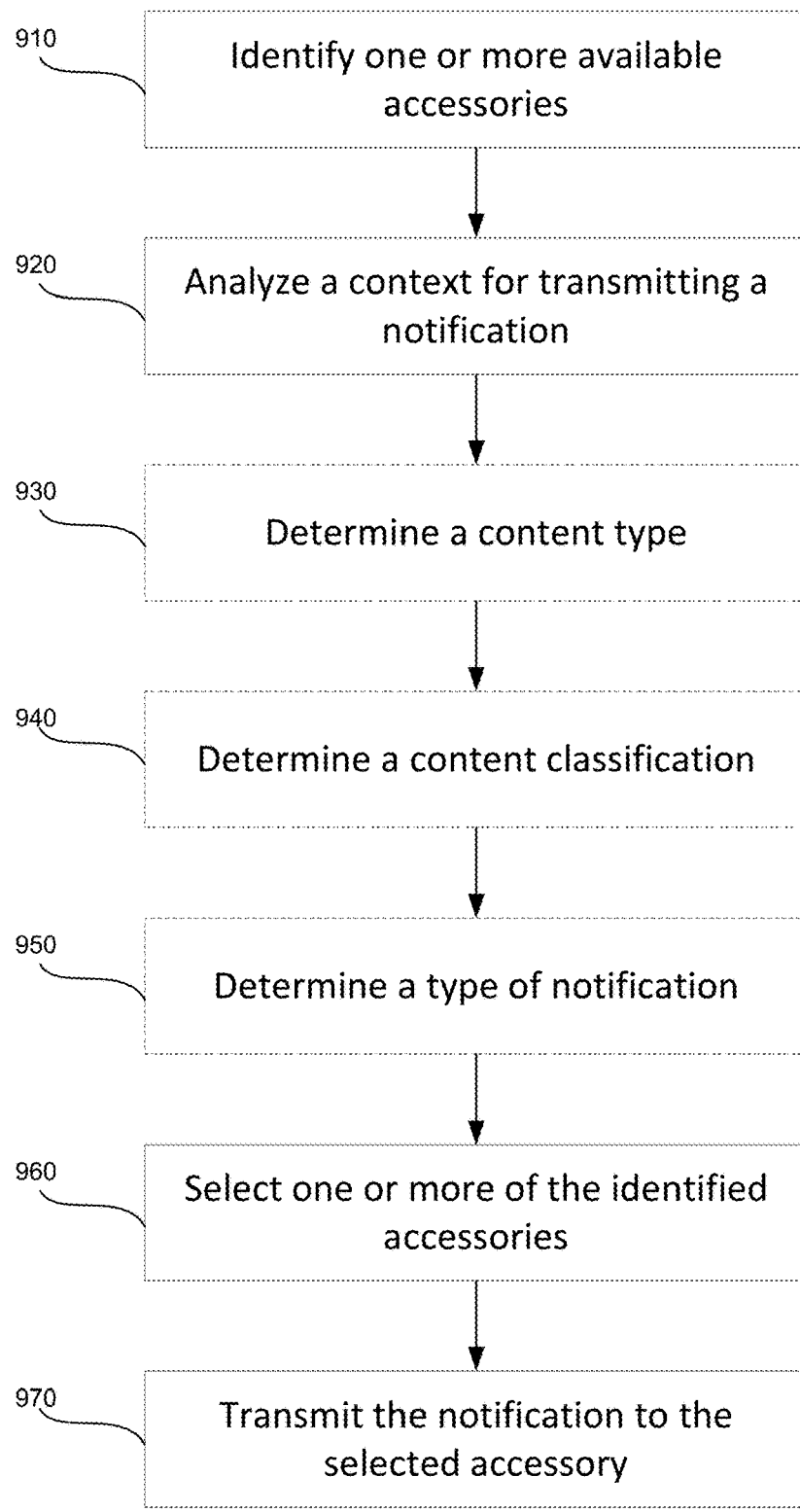
FIG. 9 is a flow diagram illustrating a method of selecting an accessory for receipt of a notification based on context according to aspects of the disclosure.

FIG. 9 illustrates an example method for determining an accessory to transmit a notification based on the context. For example, in block 910, a host device may identify one or more accessories are available to receive a notification. The available accessories may be accessories that are wirelessly coupled to the host device via a short-range communications interface.

In block 920, the host device may analyze a context for transmitting the notification based on the one or more identified accessories. For example, analyzing the context may include analyzing data from one or more sensors including an audio input sensor, image sensor, proximity sensor, etc. The context for transmitting the notification may include at least one of user attention or an accessory state. User attention may include, for example, at least one of active use of the accessories, gaze detection, pose detection, conversation detection, the location of the device, etc. User attention may be determined based on the data collected from the sensors. The accessory state may include, for example, do not disturb, silent, haptic, etc.

In block 930, the host device may determine a content type. The content type may include, for example, at least one of a text message, an e-mail, an application notification, a download, a news update, etc.

In block 940, the host device may determine a content classification. The content classification may be based on the content type or semantic analysis of the content. According to some examples, the content classification may be urgent, sensitive, customary, reminder, etc.

In block 950, the host device may determine a type of notification to transmit to the selected accessory. The type of notification may be based on the type of content, the classification of content, and/or the identified accessories. The notification type may be, for example, at least one of a visual, audio, or haptic notification.

In block 960, the host device may select at least one of the identified accessories based on the context. Additionally or alternatively, the host device may select one of the identified accessories based on the content type, content classification, and/or notification type.

In block 970, the host device may transmit the notification to the selected accessory.

The method provided herein may include all or only some of the steps disclosed. Additionally or alternatively, the steps disclosed herein may be performed in an order different than the order disclosed. Further, while the method was described with respect to the host device, a server computing device may perform some or all of the method steps.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A host device, comprising:
   a short range communications interface adapted to transmit notifications to one or more accessories;
   a memory; and
   one or more processors in communication with the memory and the short range communications interface, the one or more processors configured to:
   generate, based on a received content, a notification;
   generate ranks for each of the one or more accessories;
   identify which of the one or more accessories are available to receive the notification;
   analyze a context for transmitting the notification based on the one or more identified accessories;
   select at least one of the one or more identified accessories to receive the notification based on the context and the generated rank of the one or more identified accessories; and
   transmit the notification to the at least one selected accessory.

2. The device of claim 1, wherein the one or more processors are further configured to:
   request information from one or more sensors of each available device, the one or more sensors include at least one of (i) an audio input sensor, (ii) an image sensor, (iii) a touch sensor, or (iv) a proximity sensor;
   receive information from the one or more sensors; and
   determine, based on the received information, the context including at least one of user attention or an accessory state.

3. The device of claim 2, wherein user attention includes at least one of (i) active use of at least one of the one or more available accessories, (ii) gaze detection, (iii) pose detection, (iv) conversation detection, or (v) a location of the one or more available accessories.

4. The device of claim 2, wherein the accessory state includes at least one of (i) do not disturb mode, (ii) silent mode, or (iii) haptic mode.

5. The device of claim 1, wherein the one or more processors are further configured to:
   determine a content type for the received content;
   determine, based on the content type, a content classification; and
   determine, based on the content type, the content classification, and the one or more identified accessories, a notification type to transmit to the at least one selected accessory.

6. The device of claim 5, wherein the content type includes at least one of (i) a text message (ii), an e-mail, (iii) an application notification, (iv) a download, or (v) a news update.

7. The device of claim 5, wherein the content classification includes at least one of (i) urgent, (ii) sensitive, (iii) customary, or (iv) reminder.

8. The device of claim 5, wherein the notification type includes at least one of (i) a visual notification, (ii) an audio notification, or (iii) a haptic notification.

9. The device of claim 1, wherein the one or more processors are further configured to determine which of the one or more accessories are private accessories and public accessories.

10. The device of claim 9, wherein private accessories are accessible by a primary user of the device and public accessories are accessible to the primary user of the device and at least one other user.

11. The device of claim 1, wherein the ranking of the one or more accessories is based at least in part on one or more of (i) a proximity of the one or more accessories to the device, (ii) a determination that the one or more accessories are actively being used, (iii) a detection of a presence of a user by the one or more accessories, (iv) a wearing condition of the one or more accessories, or (v) a detection of a gaze of the user by the one or more accessories.

12. A method, comprising:
    generating, by the one or more processors based on a received content, a notification;
    generating, by the one or more processors, ranks for each of one or more accessories;
    identifying, by the one or more processors, which of the one or more accessories are available to receive the notification;
    analyzing, by the one or more processors based on the one or more identified accessories, a context for transmitting the notification;
    selecting, by the one or more processors, at least one of the one or more identified accessories to receive the notification based on the context and the generated ranks of the one or more identified accessories; and
    transmitting, by the one or more processors, the notification to the at least one selected accessory.

13. The method of claim 12, further comprising:
    requesting information from one or more sensors of each available device, the one or more sensors include at least one of (i) an audio input sensor, (ii) an image sensor, (iii) a touch sensor, or (iv) a proximity sensor;
    receive information from the one or more sensors; and
    determine, based on the received information, the context including at least one of user attention or an accessory state.

14. The method of claim 13, wherein user attention includes at least one of (i) active use of at least one of the one or more available accessories, (ii) gaze detection, (iii) pose detection, (iv) conversation detection, or (v) a location of the one or more available accessories.

15. The method of claim 13, wherein the accessory state includes at least one of (i) do not disturb mode, (ii) silent mode, or (iii) haptic mode.

16. The method of claim 12, further comprising:
    determining, by the one or more processors, a content type for the received content;
    determining, by the one or more processors based on the content type, a content classification; and
    determining, by the one or more processors based on the content type, the content classification, and the one or more identified accessories, a notification type to transmit to the selected at least one accessory.

17. The method of claim 16, wherein the content type includes at least one of (i) a text message (ii), an e-mail, (iii) an application notification, (iv) a download, or (v) a news update.

18. The method of claim 16, wherein the content classification includes at least one of (i) urgent, (ii) sensitive, (iii) customary, or (iv) reminder.

19. The method of claim 16, wherein the notification type includes at least one of (i) a visual notification, (ii) an audio notification, or (iii) a haptic notification.

20. The method of claim 12, further comprising determining, by the one or more processors based on the one or more identified accessories, which of the one or more identified accessories are private accessories and public accessories.

21. The method of claim 12, wherein the ranking, by the one or more processors, of the one or more accessories is based at least in part on one or more of (i) a proximity of the one or more accessories to a host device, (ii) a determination that the one or more accessories are actively being used, (iii) a detection of a presence of a user by the one or more accessories, (iv) a wearing condition of the one or more accessories, or (v) a detection of a gaze of the user by the one or more accessories.

22. A non-transitory computer-readable medium storing instructions, which when executed by one or more processors, cause the one or more processors to:
    generate, based on a received content, a notification;
    generate ranks for each of one or more accessories;
    identify which of the one or more accessories are available to receive the notification;
    analyze a context for transmitting the notification based on the one or more identified accessories;
    select at least one of the one or more identified accessories to receive the notification based on the context and the generated ranks of the one or more identified accessories; and
    transmit the notification to the selected at least one accessory.

* * * * *